Sept. 28, 1943.   W. BEYER   2,330,547
HIGH PRESSURE STEAM GENERATOR
Filed Sept. 21, 1939

Inventor.
Wilhelm Beyer
By  E. A. Oser.
Agent.

Patented Sept. 28, 1943

2,330,547

UNITED STATES PATENT OFFICE 2,330,547

HIGH-PRESSURE STEAM GENERATOR

Wilhelm Beyer, Berlin-Frohnau, Germany; vested in the Alien Property Custodian

Application September 21, 1939, Serial No. 295,885
In Germany October 7, 1938

4 Claims. (Cl. 122—31)

The present invention relates to high-pressure steam-generators in which superheated steam serving as heat carrier is blown by way of nozzles into the water space of boiler drums. In steam-generators of this kind, particularly if they work with chemically prepared feed water only or with high concentrated feed water respectively, corrosions may occur at the superheated steam nozzles.

In accordance with the invention these corrosions are rendered impossible by the fact that each of the nozzles is surrounded by a casing which is closed towards the water space of the boiler drum and is connected to a steam space of the steam-generator. Preferably, the space of the casing is closed not only towards the water space, but also towards the steam space of the boiler drum and is therefore connected to a steam space of the steam-generator which is separated from the steam space of the boiler drum. In accordance with a particular advantageous arrangement the space between the casing and the nozzle is connected to a part of the steam-generator carrying superheated steam. This in a most simple manner may be obtained by connecting the space of the casing to the interior of the corresponding nozzle. Each of the casings is so arranged that it encloses the nozzle particularly in the range about which alterations of the water level may occur in the boiler drum.

By the arrangement according to the invention the nozzle walls situated in the casing do not come into contact with the boiler water at all, because during operation of the steam-generator the space surrounded by the casing is completely filled with steam. The steam in the space of the casing has about the temperature of saturated steam only, as the space of the casing is strongly cooled from the exterior by the boiler water and the steam in the space enclosed by the casing stagnates. No temperature difference, therefore, practically exists at the walls of the casing. Consequently, no vaporisation occurs at the outer surface of the casings and the latter are not subjected to temperature fluctuations. Therefore, the casings themselves are not endangered by corrosion.

In the accompanying drawing two constructions according to the invention are shown by way of example.

Figure 1:
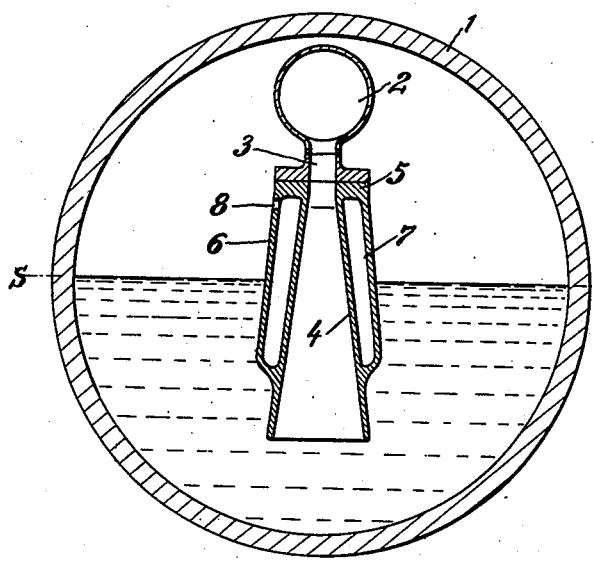
Fig. 1 shows a cross-section through a nozzle, the space of the casing being connected to the steam space of the boiler drum; this figure illustrates the general arrangement of the nozzle in the boiler drum.

1 designates the boiler drum in the steam space of which the main supply pipe 2 for the superheated heat carrier steam is arranged. This pipe 2 is provided with a branch socket 3 which may be connected by welding and to which the nozzles 4 blowing in the superheated heat carrier steam are connected by way of flanges 5 vertically directed downwardly. Each nozzle 4 is surrounded by a casing 6 which forms the space 7 around the nozzles and which extends from the flange 5 across the steam space of the boiler drum 1 as far as to the water space. Particularly, that portion of the nozzle 4 is surrounded by the casing 6 which owing to fluctuations of the water level s—s in the boiler drum 1 otherwise would come into contact alternately with water and with steam. The casing 6 is completely closed towards the water space of the boiler drum 1. The space 7, however, in the construction of the nozzle shown in Fig. 1 communicates by way of bores 8 with the steam space of the boiler drum 1.

Figure 2:
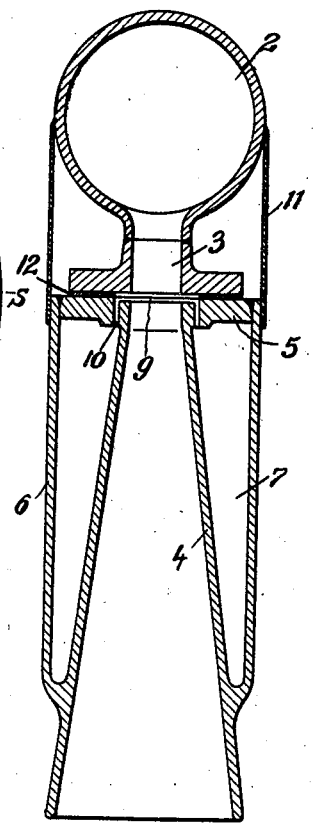
Fig. 2 is a section through a nozzle the space of the casing of which is connected to the interior of the nozzle.

According to the construction shown in Fig. 2 the casing 6 is also completely closed towards the steam space of the boiler drum 1. However, the space 7 communicates with the interior of the nozzle 4 or the connecting socket 3 respectively. For this purpose an intermediate space 9 is provided between the nozzle 4 and the connecting socket 3 and arranged between the nozzle and its flange 5 is an annular slot 10. The slot 10 preferably is uninterrupted and the flange 5 is connected for instance by welding to the casing 6 only. The nozzle 4 then may expand independently of the casing 6.

The casings 6 end in the water space of the drum 1 in a certain distance from the discharge end of the nozzles 4. If the casings 6 would extend as far as to the discharge end of the nozzles 4 water could be retained at the bottom of the space 7. The cooling action on the space 7 at the end of the nozzle 4 would be so high that the water at this place would be vaporated with certainty. Then corrosions could occur in the space 7.

In the construction shown in Fig. 2 a tube-like housing 11 or the like is provided at the upper end of the nozzle 4 which extends as far as to the tube 2 supplying the superheated heat carrier steam. This housing 11 surrounds the connecting socket 3 and partially also the tube 2 as well as the welding seam between the casing 6 and the flange 5 of the nozzle 4 and protects such portions against sprays of the boiler water.

As shown in Fig. 2 preferably an intermediate heat insulating layer 12 is arranged between the nozzle 4 or its flange 5 respectively and the connecting socket 3. Hereby, the heat conduction from the connecting socket 3 to the casing 6 of the nozzle 4 is interrupted.

What I claim is:

1. In a high-pressure steam generator a boiler drum, a water and a steam carrying space in said drum, a superheated steam carrying main in said drum, nozzles connected with said steam main for blowing superheated steam into the said water space, steam jackets surrounding said nozzles, said steam jackets being closed towards the said water space with their closed ends extending below the lower water level of the steam generator and means located above the boiler water level for supplying steam to said jackets.

2. In a high-pressure steam generator a boiler drum, a water and a steam carrying space in said drum, a superheated steam carrying main in said drum, nozzles connected with said steam main for blowing superheated steam into the water space, steam jackets surrounding said nozzles, said steam jackets being closed towards the said water space, and an orifice located above the boiler water level connecting the steam space and the inner space of the steam jackets.

3. In a high-pressure steam generator a boiler drum, a water and a steam carrying space in said drum, a superheated steam carrying main in said drum, nozzles connected with said steam main extending downwardly into the said water space, steam jackets surrounding said nozzles, said steam jackets being closed towards the said water space with their closed ends extending below the lower level of the steam generator and terminating at an axial distance from the steam discharge end of said nozzles and means located above the boiler water level for supplying steam to the said jackets.

4. In a high-pressure steam generator a boiler drum, a water and a steam carrying space in said boiler drum, a superheated steam carrying main in said drum, nozzles extending into said water space and blowing the superheated steam into the same, sockets connecting the steam main and the nozzles, steam jackets surrounding said nozzles, said steam jackets being closed towards the water space with their closed ends extending below the lower water level of the steam generator, annular slots located above the boiler water level for connecting the sockets and the steam jackets and tubular housing encasing the lower part of the steam main, the sockets and the connecting slots.

WILHELM BEYER.